United States Patent
Melugin et al.

(10) Patent No.: US 10,346,707 B2
(45) Date of Patent: Jul. 9, 2019

(54) SYSTEMS AND METHODS FOR AUTOMATED METER READING

(71) Applicant: WATER PIGEON INC., San Diego, CA (US)

(72) Inventors: Clay Eugene Melugin, San Diego, CA (US); Sarp Sekeroglu, San Diego, CA (US)

(73) Assignee: Water Pigeon Inc., La Jolla, CA (US)

( * ) Notice: Subject to any disclaimer, the term of this patent is extended or adjusted under 35 U.S.C. 154(b) by 0 days.

(21) Appl. No.: 15/620,378

(22) Filed: Jun. 12, 2017

(65) Prior Publication Data

US 2017/0364734 A1    Dec. 21, 2017

Related U.S. Application Data

(60) Provisional application No. 62/351,659, filed on Jun. 17, 2016.

(51) Int. Cl.
*G06K 9/00* (2006.01)
*G06K 9/32* (2006.01)
*G01D 4/00* (2006.01)

(52) U.S. Cl.
CPC ........... *G06K 9/3258* (2013.01); *G01D 4/008* (2013.01); *G06K 2209/01* (2013.01); *G06K 2209/03* (2013.01); *Y02B 90/241* (2013.01); *Y02B 90/247* (2013.01); *Y04S 20/32* (2013.01); *Y04S 20/50* (2013.01)

(58) Field of Classification Search
CPC .................................................. G06K 9/0063
USPC ....................................... 340/870.02; 348/160
See application file for complete search history.

(56) References Cited

U.S. PATENT DOCUMENTS

| | | | |
|---|---|---|---|
| 6,853,309 B1 * | 2/2005 | Schroter ................ | G01D 4/008 340/870.02 |
| 7,349,588 B2 | 3/2008 | Butterworth | |
| 7,619,878 B1 * | 11/2009 | Cook ....................... | G01D 4/02 137/364 |
| 8,144,027 B2 | 3/2012 | Goldberg et al. | |

(Continued)

FOREIGN PATENT DOCUMENTS

| | | | | |
|---|---|---|---|---|
| MX | PA05007195 A | * | 1/2007 | |
| WO | WO 9500822 A1 | * | 1/1995 | ............... G01D 5/39 |

OTHER PUBLICATIONS

International Search Report & Written Opinion of the International Searching Authority PCT/US2017/037056 dated Aug. 23, 2017.

*Primary Examiner* — Dave Czekaj
*Assistant Examiner* — Shanika M Brumfield
(74) *Attorney, Agent, or Firm* — Jeffrey T. Sheriff; Pillsbury Winthrop Shaw Pittman LLP

(57) ABSTRACT

Systems and methods are provided for optically reading data from metering equipment by using a camera to record images of a meter, and converting the displayed data measurement regions of the images into alphanumeric data for reporting over a wireless network to a database system for storage, analysis and reporting. One implementation of the device is a water meter reading device integrated into a form factor that replaces the lid of a water meter box. The device captures images of the meter face, converts the images using optical character recognition software into usage data, meter identification and date/time of the data capture and sends the data to a database over a wireless data network.

20 Claims, 10 Drawing Sheets

(56) References Cited

U.S. PATENT DOCUMENTS

| | | | |
|---|---|---|---|
| 2003/0034900 A1* | 2/2003 | Han | G01D 4/004 340/870.02 |
| 2004/0006439 A1* | 1/2004 | Hunter | G01D 4/004 702/61 |
| 2004/0021568 A1* | 2/2004 | Seal | G01R 22/066 340/551 |
| 2004/0027253 A1* | 2/2004 | Marsh | G01D 4/008 340/870.02 |
| 2004/0243524 A1* | 12/2004 | Crichlow | G01D 4/004 705/412 |
| 2005/0201619 A1* | 9/2005 | Sun | G06K 9/3266 382/176 |
| 2008/0086394 A1* | 4/2008 | O'Neil | G01D 4/004 705/63 |
| 2008/0150750 A1* | 6/2008 | Parris | G01D 4/002 340/870.02 |
| 2009/0255346 A1* | 10/2009 | Hendey, Sr. | G01F 15/063 73/861.77 |
| 2014/0110472 A1 | 4/2014 | Seekola | |
| 2014/0139682 A1 | 5/2014 | Lye et al. | |
| 2015/0122959 A1* | 5/2015 | Cook | G01F 15/18 248/205.1 |

* cited by examiner

SYSTEMS AND METHODS FOR AUTOMATED METER READING

CROSS-REFERENCE TO RELATED APPLICATIONS

This application claims priority and benefit to U.S. Provisional Application No. 62/351,659, filed on Jun. 17, 2016 and entitled "AUTOMATED METER READING DEVICE AND SYSTEM", the contents of which is incorporated herein by reference in its entirety.

FIELD OF THE INVENTION

This disclosure relates to systems and methods for automated meter reading.

BACKGROUND

Visually reading water meters or other measurement equipment is a time consuming and expensive data collection method. Replacing or upgrading meters to enable automated data collection and communication of the data is a very time consuming and expensive effort, but it is proven to help consumers reduce usage of resources (water, electric, gas, etc.) as well as detection of leaks or system level losses of resources, and create demand forecasting.

Replacing existing mechanical water meters with electronic digital meters that interface to radio modules is a labor intensive effort requiring removal of existing equipment and installation of a new digital meter and a radio module that sits adjacent to the meter and requires an antenna port through the meter box lid to enable wireless connectivity. The meter replacement process creates additional labor efforts if the new meters are not the same physical dimension as existing meters, requiring modification of the water line, and in the process a water service shutoff and potential contamination issues that require flushing of water lines, and onsite disinfection treatment.

SUMMARY

One aspect of the disclosure may relate to a system configured for automated meter reading. The system may comprise one or more hardware processors configured by machine-readable instructions to capture an image of a meter register; perform optical character recognition (OCR) on the image; import the meter register image; determine if a new meter register value result is within a given range limit; and flag for review usage of a meter containing the meter register upon a determination that the new meter register value result is not within the given range limit. A flow indicator or dial needle may be used for sizing water consumption (e.g., possible leaks).

Another aspect of the disclosure may relate to a method for automated meter reading. The method may comprise capturing an image of a meter register; performing OCR on the image; importing the meter register image; determining if a new meter register value result is within a given range limit; and flagging for review usage of a meter containing the meter register upon a determination that the new meter register value result is not within the given range limit. A flow indicator or dial needle may be used for sizing water consumption (e.g., possible leaks).

DETAILED DESCRIPTION

Figure 1:
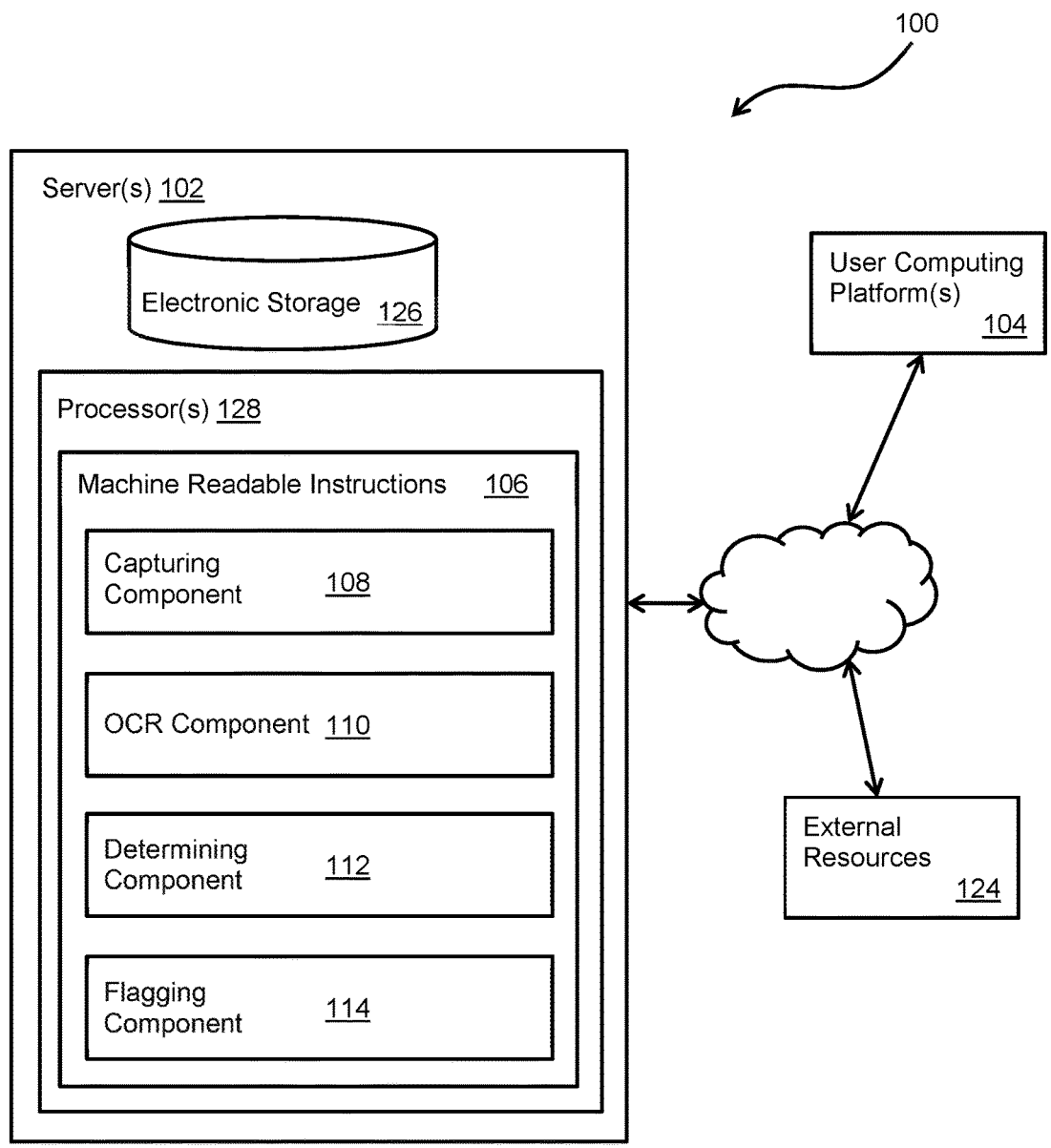
FIG. 1 illustrates a system for automated meter reading, in accordance with one or more implementations.

Optically reading meters in person or using a camera image sensor poses challenges in converting images into data in a reliable manner, but optical character recognition (OCR) software may be provided and configured to enable reliable conversion of images to data. The physical challenges of optical reading is interference from dirt, water condensation, flooding, poor lighting, and insects or creatures that can interfere with capturing images of the meter data register in the form of dials, rolling number counts, or LCD displays as water meters are frequently located in outdoor in-ground meter boxes that are not fully protected from the environment.

To be effective an automated water-metering device should operate without an external power supply for a long period of time (up to 20 years or more) without human intervention. During this period the device should operate autonomously but remain in time synchronization to collect, store and communicate data back to a central database system to be of value beyond simple meter read reporting. Meter reading devices should be adaptable to meter installations which can vary in distance and orientation angle relative to the meter box lid (meter reading lid).

In some implementations, a water-reading meter system configured to be built into a water meter box is provided. In some implementations, no replacement of the meter is required and no connection or attachment to the meter is required. The reading of the meter may be performed optically and sent to a database.

Some implementations of this disclosure relate to an automated water meter reading device that mounts opposing to measurement equipment or gauges to automatically record and communicate data back to a central database using a wireless network. Some implementations include a water meter box lid that optically reads water usage data and communicates the data over a wireless network connection to a database, providing water usage, tamper detection, leak detection, auditing of automated meter reading and meter identity verification.

In some implementations, an automated water meter reading device replaces the water meter box lid with a lid containing the electronic circuits, sensors, processors, software, wireless modems and energy storage elements required to automatically read the meter data and transfer collected data over a wireless connected network to a database system for recording, reporting and analysis.

The lid may integrate a camera image sensor and lens to capture an image of the meter face where the usage meter-register, flow indicator or dial and barcode and/or meter identification label are located. This image is processed to capture usage data, flow indication and meter identification. A wireless modem is used to transfer the data, and enable meter reading device configuration updates.

In some implementations, the present technology advantageously provides leak detection capability remotely and optically on a mechanical meter. Prior art attempts required someone to physically watch the meter at the location of the meter for a period of time to determine the presence or absence of a leak. The person would also have to have knowledge of what is going on in the property (e.g., whether a faucet was leaky, whether someone flushed a toilet, whether the dishwasher is on, etc. to avoid mis-interpretation of intentional flow from a leak.)

FIG. 1 illustrates a system 100 configured for automated meter reading, in accordance with one or more implementations. In some implementations, scheduling system 100 may include one or more servers 102. The server(s) 102 may be configured to communicate with one or more computing platforms 104 according to client/server architecture, a peer-to-peer architecture, and/or other architectures. The users may access system 100 via computing platform(s) 104. A platform is an underlying computer system on which application programs can run.

The server(s) 102 may be configured to execute machine-readable instructions 106. The machine-readable instructions 106 may include one or more of a capturing component 108, an OCR component 110, a determining component 112, a flagging component 114, and/or other components. The capturing component 108 may be configured to capture an image. In other words, the capturing component 108 causes the image to be taken by a camera and stored in any suitable location. The OCR component 110 may be configured to perform optical character recognition on an image. The determining component 112 may be configured to determine if a reading is within a given range limit. The flagging component 114 may be configured to flag a potential problem at a water meter (e.g., detecting a leak or other problem). The machine-readable instructions 106 may be executable to provide the capability for analytics and/or data mining.

Figure 2:
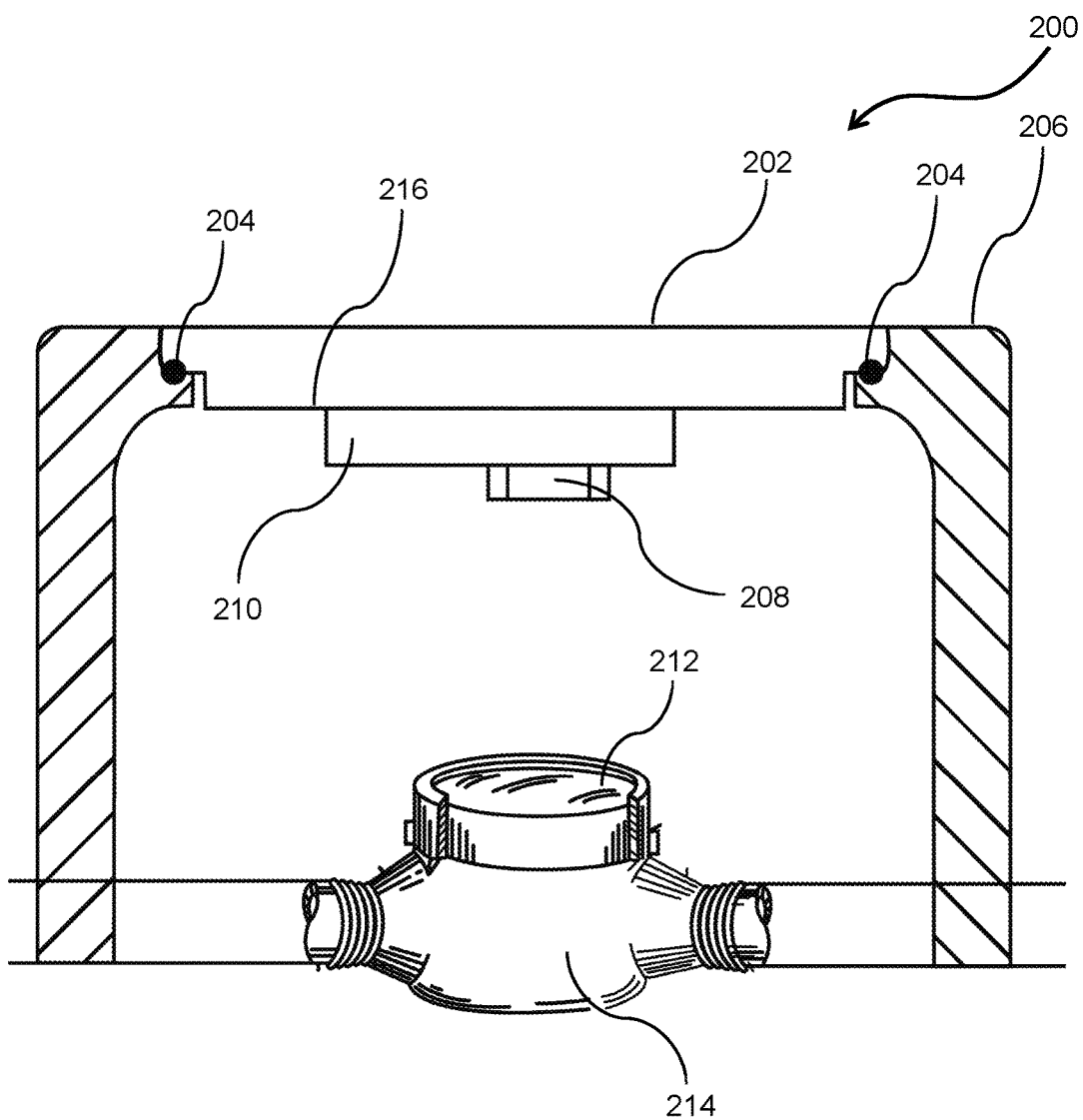
FIG. 2 illustrates a system including a meter reading device lid assembly in position over a water meter that is mounted in a box, in accordance with one or more implementations.

FIG. 2 illustrates a system 200 including a meter reading device lid assembly in position over a water meter that is mounted in a box, in accordance with one or more implementations. A top surface 202 of the lid is exposed to the outside environment. Also depicted are a lid gasket seal 204, an in-ground meter box 206, a lens air gap 208, the electronics enclosure 210, a water meter face 212, a water meter main body 214, and a sliding rail(s) 216 for positioning the electronics enclosure 210 in order to make the camera alignment correct. In some implementations, instead of the sliding rails 216, slots may be used for adjustment. In either case, a two-dimensional slide element may be implemented. The lens air gap 208 prevents water, dirt, etc. from contacting the surface of the lens. In order to prevent condensation (especially in cold environments) from forming on the optical surfaces of electronics enclosure 210 and/or lens air gap 208, a hydrophilic coating may be applied to a bottom surface of the electronics enclosure 210 and 208. The hydrophilic coating absorbs water. This coating or other variants applied in different manners may be added to the meter face 212 as well. For example, for the meter face a coated film may be used that is applied to the meter versus coating the meter face. This may be faster and easier than implementing an air-cured coating in a dirty meter box environment. However, any suitable methods are contemplated. The coating need not be a hydrophilic coating, but may be any suitable coating that helps eliminate the beading effects of condensation.

In some implementations, a meter reading lid is a meter-reading device that replaces an existing water meter box lid with an equal size and shape lid containing an integrated optical sensor, lens, image processing, optical character recognition, data processing, real time clock, energy storage, tamper detection, leak detection, tamper detection, data security, and/or wireless connectivity that enables reading a water meter optically and transferring water meter images and optical character recognition readings of the data to a remote database system for storage and analytics processing. This device can be remotely or locally configured for imaging parameters, data collection schedules, reporting, alert monitoring and responses.

Figure 3:
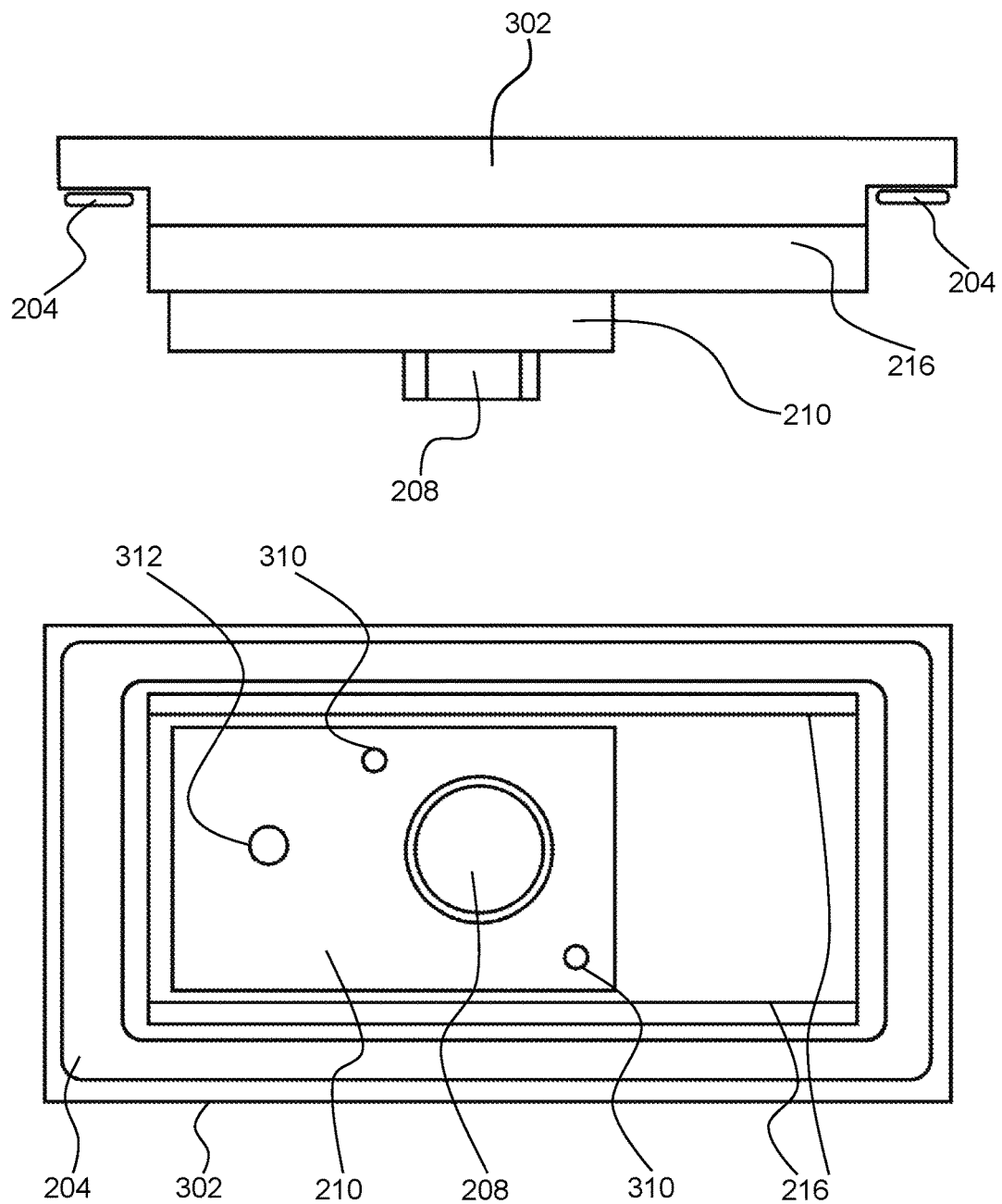
FIG. 3 illustrates elements of the meter reading device lid, in accordance with one or more implementations.

FIG. 3 illustrates elements of the meter reading device lid, in accordance with one or more implementations. The elements include the lid body 302, the lid gasket seal 204, an electronics enclosure 210, the lens air gap 208, the sliding rail(s) 216 (or other two-dimensional slide element) for positioning the electronics enclosure, flash lighting ports 310, and a light/tamper sensor (312).

Figure 4:
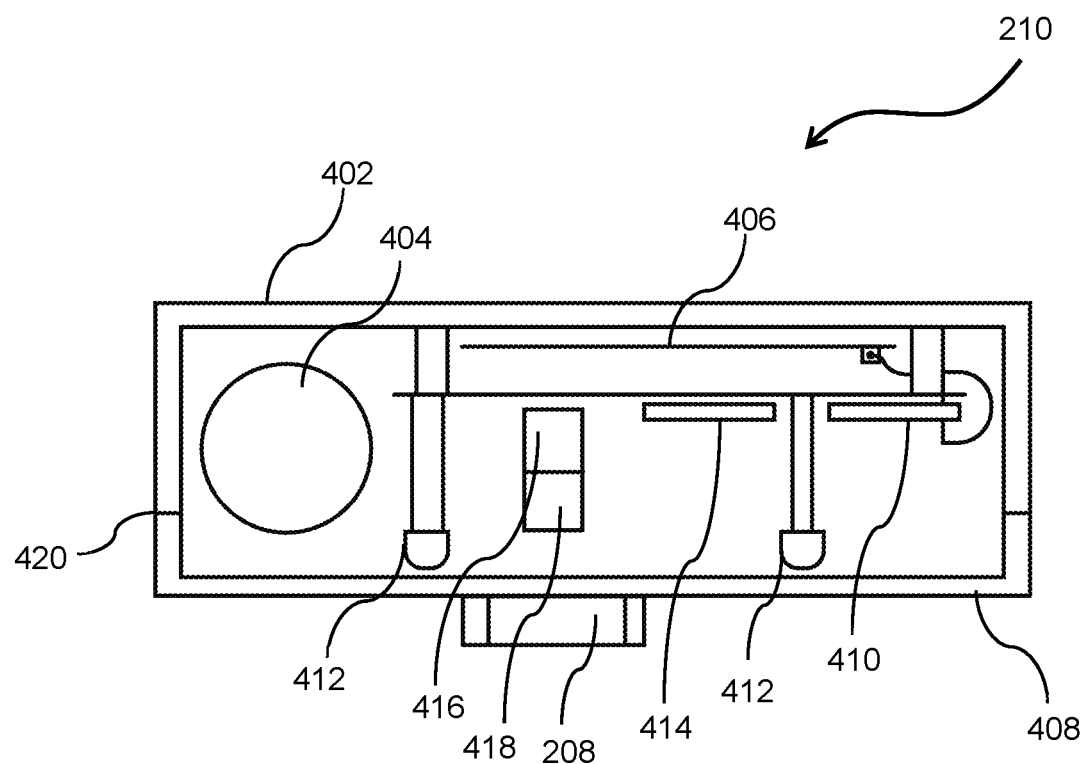
FIG. 4 illustrates a cross section of an electronics enclosure showing internal components, in accordance with one or more implementations.

FIG. 4 illustrates a cross section of the electronics enclosure 210 showing internal components, in accordance with one or more implementations. Depicted are an electronics enclosure base 402 without the main lid body attached, a battery 404, wireless antennas 406 attached to the electronics enclosure base 402, an electronics enclosure top 408, wireless modems 410, lighting sources (flash) 412, a main processor 414, a camera image sensor 416, a camera lens 418, the lens air gap 208, and a waterproof seal 420.

Figure 5:
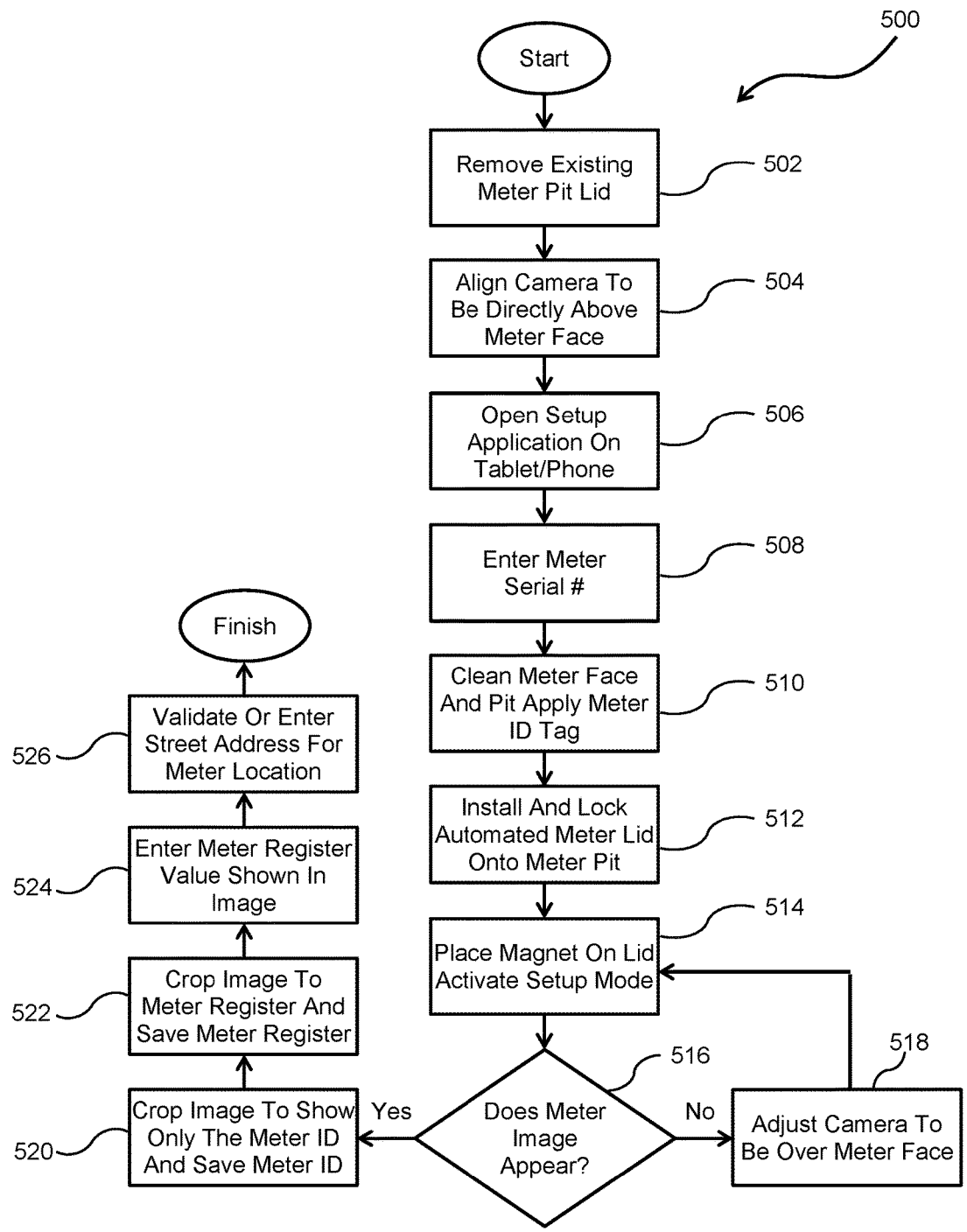
FIG. 5 illustrates a method for a meter reading lid setup, in accordance with one or more implementations.

FIG. 5 illustrates a method 500 for a meter reading lid setup, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, one or more operations of method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, the existing meter box lid is removed. The lid may be formed from plastic, concrete, or any other suitable material. The inside of the meter box may be cleaned.

At an operation 504, the camera is aligned within the lid to be directly above the meter face. The new lid (e.g., Water Pigeon lid) is then installed on the meter box.

At an operation 506, a setup application is opened on a tablet, phone, computer, etc. The lid may communicate wirelessly with a server.

At an operation 508, the meter serial number is entered into an app on the tablet, phone, computer, etc. The meter serial number is associated with an address.

At an operation 510, the meter face and pit are cleaned and a unique meter ID tag is applied to the face of the meter so as not to occlude the meter register. Advantageously, applying the meter ID tag (label) gives a clear association between that meter, the meter number, the customer address. In some implementations, the various times the meter face is read the Meter ID tag (label) is validated. The meter ID tag may be formed from aluminum or another material. The meter ID tag may include a barcode. GPS is used to record the location (geo-tag) the unit so that if it fails or is taken, its installed location is known.

At an operation 512, the automated meter lid (with camera) is installed and locked or cabled onto the meter pit (meter box).

At an operation 514, a magnet is used to activate the unit into a setup mode. The magnet activates a switch. The unit then "wakes up" and is activated and turned on and talks/connects to the wireless network and server.

At an operation 516, a determination is made as to whether a meter image appears on the tablet, phone, computer, etc.

At an operation 518, if the meter image does not appear then the camera is adjusted to be over the meter face.

At an operation 520, the image is cropped to show the meter ID (or only the meter ID), and the meter ID is saved and may go to a server and to the lid. The system may crop to the full meter face, crop to the meter register where the numbers are located, and crop to the meter ID label that was added on. The system may also crop around the needle that gives an indication of water consumption and/or crop an image of a flow indicator dial 608 used for leak detection.

At an operation 522, the image is cropped to the meter register. The image is saved and may go to a server and to the lid.

At an operation 524, the meter register value shown in the image is entered into a tablet, phone, computer, or other device. This initial meter reading is a starting point for the OCR to begin operation.

At an operation 526, a street address for the meter location may be validated or entered.

Figure 6:
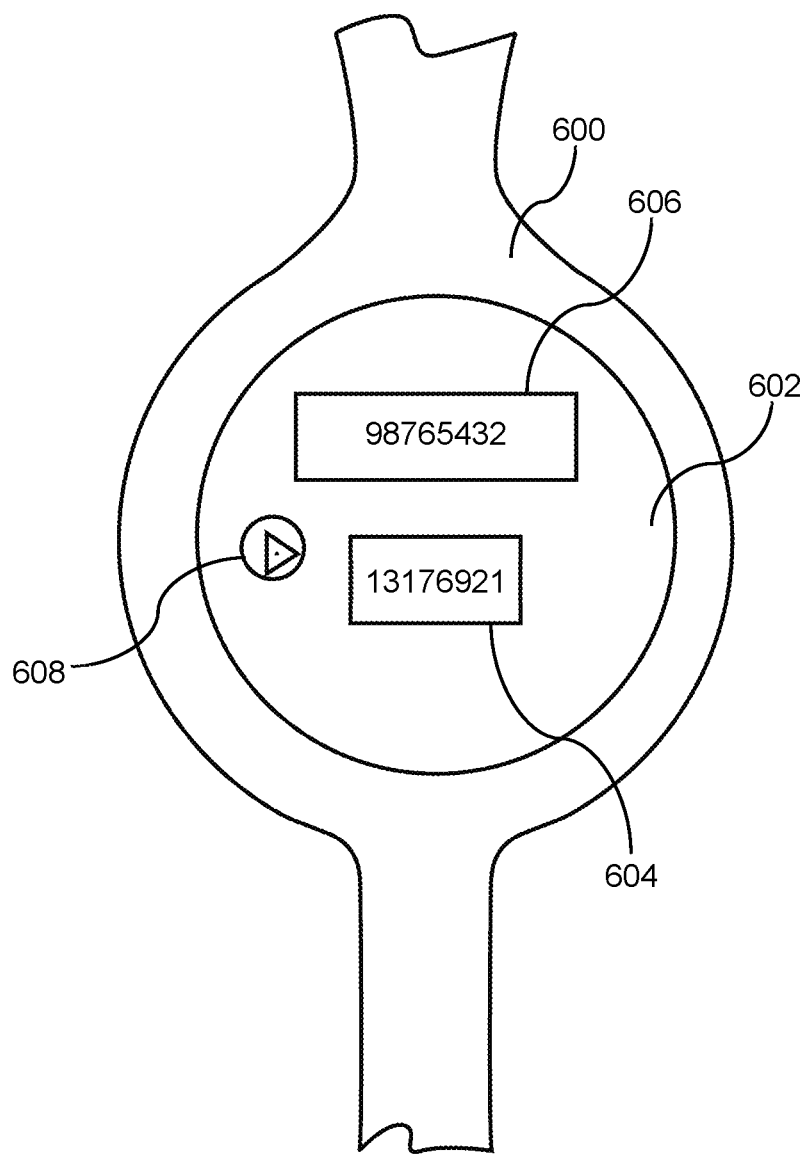
FIG. 6 illustrates a meter face, where usage readings may be displayed, in accordance with one or more implementations.

FIG. 6 illustrates a meter face 602 (of meter 600), where usage readings may be displayed, in accordance with one or more implementations. Meter 600 includes meter face 602, meter identification label 604, meter register 606, and flow indicator or dial 608 and/or a needle. It is known in the art that there are two flow indicators (a flow indicator or dial 608 and/or a needle) in a meter, both of which are different from the meter register. The meter register shows the total meter usage. The dial or needle may be cropped and used to read water consumption (e.g., leak size).

Figure 7:
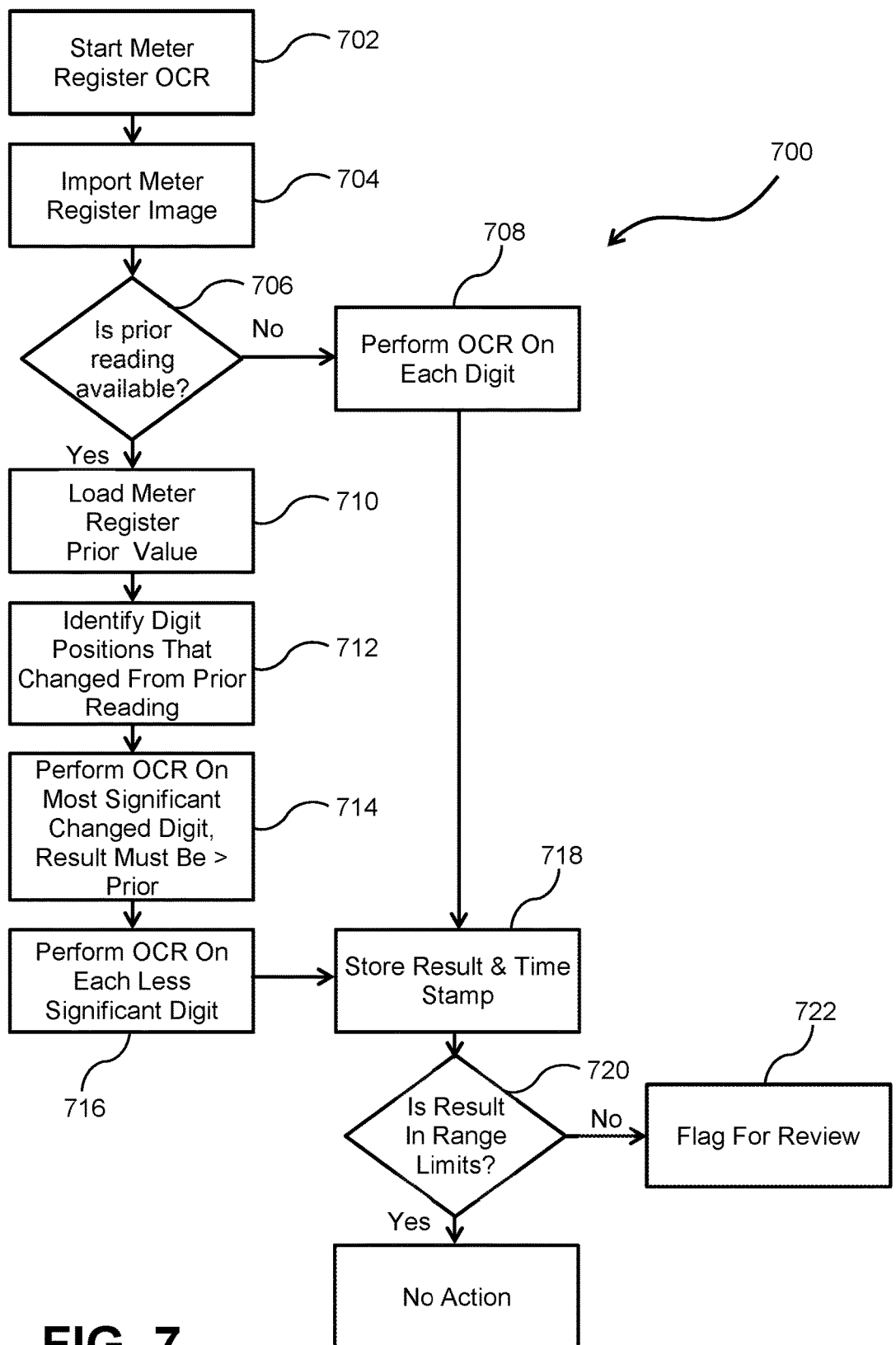
FIG. 7 illustrates a method for meter-register optical character recognition (OCR), in accordance with one or more implementations.

In some implementations, with respect to meter register reading, the lid (meter reading lid) performs OCR of images captured to determine the data of the meter register 606. The meter register data recognition may be implemented with rules regarding the order of the data that each register reading will yield data equal to or greater than the prior meter reading. As shown in FIG. 7. the rules flow first verifies which register numbers have remained the same from the prior reading. The changed digits are then processed under sequential rules from the most significant changed digit to the least significant digit. The final value of the resulting meter register data is compared to boundary limits that represent a maximum expected change in the time period since the prior reading, if the data is out of bounds both the image and the data is flagged and sent to the server for review on the next scheduled communication event.

In keeping with implementations according to the present technology, the water meter is physically marked with a meter identification label 604 on the meter face (see FIG. 5). The meter identification label 604 includes a unique number that identifies the meter. Each optical reading of the meter records the meter identification label of the meter. The meter reading lid keeps a record of the meter identification label that it is registered with, and it verifies the meter identification label on every meter-reading event. The meter identification label 604 is specific to each utility and consumer account; hence readings are recorded in the server database based on the meter identification label data. In some implementations, a barcode label is used instead of a meter identification label. As used herein, in some implementations, wherever a meter identification label is mentioned, a barcode label may be substituted instead.

In some implementations, the meter reading lid will perform OCR verification of the image captured to determine if the meter identification label 604 has changed from the prior recording, or from initial set-up of the meter reading lid. If the verification indicates a change, the image will be flagged and sent to the server for review on the next communication event. This process reduces the processing time and energy consumed by using a defined character verification rule to verify each digit of the reading. This process can be configured to occur on every reading, or on a specific period of time, or only after a tamper detection alert has occurred, this would reduce battery energy consumed by decreasing processing time for verification.

In some implementations, the meter reading lid camera (416 and 418) views the meter through an optically clear port called the lens air gap 208 integrated into the electronics enclosure top 408, which creates an air pocket between the optically clear port and water that may fill the meter box during a flood. This air pocket enables reading the water meter register if the meter box is flooded, and it prevents contamination of the camera viewing port by eliminating direct contact to water.

In some implementations, the meter reading lid may include a real time clock enabling it to operate in a low power state until a preconfigured time of operation is required. The real time clock is synchronized to network time during installation when connected to the setup application via a wireless connection (e.g., cellular etc.) and/or Bluetooth. As used herein, in some implementations, wherever Bluetooth is mentioned a wireless connection (e.g., cellular etc.) may be implemented. In some implementations, a proprietary form of Bluetooth may be implemented throughout this disclosure. During regular autonomous operation the real time clock synchronization occurs on network and backend server database connections. The synchronization updates may be configurable to update on every network connection, but may also be configured to update only after a specific period of time has expired or will expire before the next scheduled network connection to reduce energy consumption.

One or more processors in the meter reading lid calculate the amount of energy used from the battery based on predefined algorithms that account for environmental and device events. Using these algorithms, the devices will dynamically manage reporting intervals to reach targeted battery life by tracking cumulative energy consumption based on predefined events and actual conditions. Factors used in determination of the Joules of energy consumption include temperature, number of images captured, number of images processed, number of wireless data connections, wireless received signal strength measurements, transmit power levels, data payload size, network transport configuration, battery capacity, age of battery, self-discharge rate of battery, OCR processing time, forward looking mandatory reporting schedule limits, etc. This data is also sent to the backend server to enable forward-looking impact of configuration changes by the system operator, and the server may also change the devices schedule for reporting to manage battery life expectancy.

The meter reading lid may use images to collect data; these images may also be used to detect meter tampering. Once the meter reading lid is installed the interior of the meter box is dark. Meter reading lid removal may be sensed by a tilt switch and/or light sensor (photo resistor) that triggers a tamper alert via a processor interrupt input. In some implementations, an accelerometer may be implemented. This may allow the system to sense if the lid is moved, lifted, removed, or otherwise tampered with.

In some implementations, tamper alert is configured to perform multiple responses including image capture during tamper detection and/or after tamper alert is cleared. In both cases the image may be used to determine the result of the meter box entry. Device processing of the captured image is performed to determine if the meter readings were modified, if the meter was removed or replaced, and if a field inspection is required to investigate the entry. If a field investigation is requested, the full field of view image is sent back to the central server immediately, otherwise the event is recorded as a meter reading and sent back with a tamper flag detection in the next scheduled network connection. These configurations can be modified remotely or on location.

Meter removal and replacement (e.g., tampering) may be detected by image capture. This may be referred to as tamper detection. Meter identification labels 604 are checked on each image capture (or a plurality of image captures) for verification, and negative verification is flagged and reported on the next scheduled meter reporting cycle. Full field of view images, or just meter register, and meter ID tag are configured for transmission based on failure of identification.

Leak detection may be performed using motion-tracking software on the camera video mode or time lapse static images of the flow indicator dial 608 or needle. Leak detection may also be performed by using timed readings on the meter register 606 and flow indicator dial 608 and/or needle to calculate usage. Static time lapse may be implemented to improve leak detection. Leak detection may be performed on the meter reading lid using various methods.

One method involves using the meter reading lid camera and motion sensing software. A visual detection of motion in the meter flow indicator may confirm water flow over a short period of time (measured in seconds). Another method involves performing OCR on meter register images. This is used to determine if water is consumed in the time between successive images. Water usage is an indicator of a water leak if the usage is detected consistently in times when water usage is uncommon such as in the early morning hours when most people and businesses are inactive. The volume of water leaking can be determined as readings are recorded and alerts are sent to a central server based on various configuration settings. Some examples of configuration settings may include sending data to the central server once a month, once every two days, once a day, every hour, or every 15 minutes, and meter register recording intervals such as 15 minutes, 1 hour, 6 hours and such intervals that may of use to detect unknown water flow.

In some implementations, an audit mode is envisioned. During setup, or remotely from a central server, the meter reading lid may be configured to deliver images, OCR data, and/or other data. This enables auditing of system performance on a regular schedule without visiting the meter location. The audit configuration may set meter readings for any designated period of time for a defined duration of time creating the ability to do a high-resolution profile of water usage. For example, the meter may be read every 15 minutes for a 24-hour period with data only sent back at the end of the period, or the system may be configured to send back total usage data with an image on specific dates and times such as, for example, monthly billing cycles.

In some implementations, image batch processing is contemplated. When the meter reading lid is configured to send OCR output data on a periodic schedule (as one example, once a week), it will perform OCR after all (or a plurality of) images are collected. This reduces the energy consumed relative to performing OCR immediately at each image capture. This saves resources including energy, memory, processing time, etc.

Image data compression may be implemented. OCR output data may be compressed by sending consecutive readings as differentials (difference from prior reading) rather than full meter register readings. This compression is removed at the central database to record actual meter data. This data compression reduces the data payload and energy consumed to transmit data over the wireless network. This setting is configured remotely or in an on-site setup process. It is of value for things such as meter auditing where high-resolution meter data is required.

In some implementations, cloud server OCR is envisioned. OCR of meter images may be performed on the meter reading lid, or in the backend server using images that are received. The option is configured remotely, or during the initial set up process. When data and images are received with flags indicating potential errors, OCR is performed on the server to see if the same results are achieved confirming an issue before human intervention is requested. OCR algorithms on the backend server may run alternative OCR approaches that are not available on the meter reading lid.

In some implementations, an irrigation metering application programming interface (API) or application protocol interface may be used. With the audit mode configuration, the meter reading lid may be configured to record water usage in specific intervals of scheduled irrigation zone run times. The run times may be remotely programmed to enable collection of accurate water consumption data for each irrigation zone. An API is used to request the irrigation data collection from the backend server that controls the meter reading lid configurations. Auditing irrigation system operation to known schedules accurately determines water consumption in a specified period of time correlated to irrigation zones. Irrigation leaks or malfunctions can be detected by increased rate of water consumption on specific irrigation zones enabling notifications of leak detection to be generated with accurate details. The water usage rate is vital in setting up irrigation zone watering times to achieve optimal water application. This may also show a failure of irrigation with respect to water being applied to crops, grass, etc. For example, a valve may not be operating properly or breaks. A valve may fail to turn on or may fail to turn off. The technology may show a failure or an irrigation system to operate and deliver water to crops, grass, vegetation, etc.

In some implementations, an auto-cropping feature may be realized. To reduce image processing time and energy consumed by optical character recognition, a label or marking may be added to the meter face 602 to provide a rectangular border enclosing the meter register data 606 and the meter unique identification label 604, plus a border for the flow indicator dial 608 or needle. These borders enable image capture to be processed by shape and/or color filtering. For example, a red box may be detected and a location defined as meter register, and a green box may be detected and a location defined as meter identification label. Auto-cropping software on the meter reading lid or central server may isolate and identify specific image areas reducing the image pixel count, and identify the images to specific data types. This enables optimized OCR rules that match the expected characters and fonts in the image field. Also, when the meter reading lid is to transfer an image to the backend database system only the identified areas of the image need to be transferred in some implementations. This saves energy and reduces the amount of data sent over the wireless network.

In some implementations, the design of the meter reading lid incorporates a sliding rail 216 design that enables adjusting the position of the camera 416 and 418 and lens air gap 208 by changing the position the electronics box 210 in the meter lid housing (or simply meter lid or lid) 202. This adjustment mechanism may be used during the installation of the meter reading lid 202, so the camera 416 and 418 and lens air gap 208 may be aligned directly opposing the meter face 602.

In some implementations, the meter reading lid may use a magnet-activated switch to initiate operation after it is installed in the field. A magnet placed in the proper position on the meter reading lid may either initiate the startup sequence enabling a local setup configuration process, or activate a remote configuration process. This function may be security-enabled to allow connection by authorized equipment only, and the switch may be disabled in configuration settings to prevent unauthorized access to the device.

An on-site meter reading lid setup process has been discussed herein. In some implementations, the meter reading lid may be configured on-site at the installation location. FIG. 5 shows an exemplary setup and configuration process. Setup on location may be enabled using a Bluetooth data link or short-range wireless or cellular data link. Essential to the set up process is the alignment of the camera port on the meter reading lid sliding rails 216 prior to installation onto the meter box. Once the meter reading lid is installed, the setup process may be initiated by placing a magnet on the correct location on the meter reading lid initiating the setup process, which captures and sends the first image of the water meter to the installer's phone/tablet/computer running the proper interface application. The image shown on the installer's device is the full field of view image from the meter reading lid camera. The installer uses the application to mark or create a box around the meter data register where total water usage is shown and saves the image location. The installer manually enters the initial meter register reading into the application to provide OCR algorithms as a starting point for future readings. Next, the meter identification (ID) number is marked and saved. The installer then enters the meter number (operation 508) that may be permanently marked onto the meter body, validates or enters the street address, validates or enters the reading units in gallons, cubic feet, etc. are also validated from the meter face as needed. Some of this information may be automatically populated after the meter permanent number is recorded and verified by the installer. To eliminate manual entry the setup application software may perform automatic cropping of meter-register and meter identification label images, but installer verification is required (in some implementations) to assure data integrity. As the installer completes the set-up process, the meter reading lid configuration information may be transferred from the installer's device to the backend server, and the meter-reading lid may make its first connection to the backend server to verify the device is operating properly. The original installation image may be sent in full field of view back to a central server as an image record for future use.

The meter reading lid set-up process can be performed remotely. After installation of the meter reading lid 202, the installer initiates the remote configuration process by placing a magnet on the meter reading lid to initiate the remote set up process. The installer still needs to confirm the initial readings and meter identification label on-site, but other steps may be automated or performed manually from the backend server using the wireless network for communication to the meter.

Returning to FIG. 1, in some implementations, server(s) 102, computing platform(s) 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, computing platform(s) 104, and/or external resources 124 may be operatively linked via some other communication media.

FIG. 7 illustrates a method 700 for meter-register optical character recognition (OCR), in accordance with one or more implementations. The operations of method 700 presented below are intended to be illustrative. In some implementations, method 700 may be accomplished with one or more additional operations not described, and/or without one or more of the operations discussed. Additionally, the order in which the operations of method 700 are illustrated in FIG. 7 and described below is not intended to be limiting.

In some implementations, one or more operations of method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At an operation 702, the meter register OCR is started. That means than an image of a meter register is captured and OCR is performed on the image.

At an operation 704, the meter register image is imported. The image may be cropped to the relevant data field.

At an operation 706, a determination is made as to whether a prior reading of the meter register image is available. This determination may be accomplished in various ways. In some implementations, the first meter reading is entered during the setup process (FIG. 5) by the installer.

In some implementations, the determination may be accomplished by the fact that there was a successful OCR reading on the prior image.

At an operation 708, if no prior reading of the meter register image is available then the process proceeds to operation 708. If a prior reading of the meter register image is available then the process proceeds to step 710.

At an operation 708, OCR is performed on each digit of the meter register image.

At an operation 710, if a prior reading of the meter register image is available then the meter register prior value is loaded. In some implementations, the prior reading is stored in the meter reading lid memory, and recovered by a processor for comparison verification of the current meter register data image.

At an operation 712, an identification is made of the digit positions that changed from the prior reading. This is referred to as verification. Rather than run the full OCR process on each digit, the process starts with the most significant digit and performs a confidence check on that number relative to the meter register most significant bit (MSB) number, if confidence is high (e.g., greater than 90% or some other number) it is verified to be the same number as the prior reading of that MSB. If there is not a high confidence then the numbers from that digit down are OCRd digit-by-digit. If no digits have changed, the verification is a really fast process (e.g., 10% of the time and energy may be required compared to other methods).

At an operation 714, OCR is performed for the most significant changed digit, and all less significant digits of the meter register 606. A process similar to that described with respect to operation 712 may be implemented. For example, referring to FIG. 6, if the first three most significant digits (987) are the same but the next digit (6) has changed then you start the OCR at digit 6 and the digits to the right of digit 6. Digits 9, 8, and 7, do not need OCR performed on them in this case. The system may determine if a digit changed or did not change by using the verification process described herein. The system will know that if digit 6 changed, it should now be either 7, 8, or 9 because the value should not decrease. This saves resources including time and energy. Verification of a number uses a fraction (e.g., 10% or another fraction) of the time and energy compared to checking 0-9 to identify the number match. OCR really is just matching pixel patterns and establishing a confidence as to whether a digit is a 0 or an 8 for example. For example, the run time of an OCR process to check each of the digits (typically 8 digits) in a meter register may take 3 ms or another amount of time, instead of 4 ms.

At an operation 716, OCR may be performed on each less significant digit, and the result should be that the 6 changed into a 7, 8, or 9. At operation 712, the digits that changed were identified. OCR is run on all the digits that changed, but OCR is not run on the digits that did not change, which are going to be the most significant digits in the meter reading that only change every year, or quarter-year, or some other period of time.

In some implementations, OCR could be run on each digit every time, but the above implementation saves some time and hence energy for the battery, allowing the unit to live longer and/or able to do perform more reads per day. It may be possible to use a smaller, lower-cost battery and still have a very long battery life (e.g., a period of time such as 20 years or longer).

At an operation 718, the OCR data is received from either operation 708 or operation 716. The result is stored with a time stamp of when the image was captured.

At an operation 720, a determination is made as to whether the result is within range limits. For example, a meter of a given size can only deliver a certain number of gallons of water in a given time period at a set pressure level. This is a physical max capacity limit. Another limit can be set by running analytics on that meters historical water usage. The most gallons water the user has every used in an hour may be determined. The limit can be set to that value. One usage limit is 0. Typically, the water usage should never be negative. It can happen but it is a really dangerous condition if water flow backwards into the water supply (consider someone forcing poisoned or contaminated water back into the water supply).

In some implementations, the maximum accurate flow rate through a meter has an upper limit. One example is a broken water main at the outlet of the meter. The outlet would put out a flow rate that exceeds the pre-determined flow rate of the meter. This would represent a high range. For example, a typical ⅝-inch meter has a normal operating range up to 20 gpm and a 1-inch meter has an operational range up to 50 gpm. Through analytics or other means the highest amount of water a user has consumed in an hour may be determined. A percentage (e.g., 15% or another percentage) may be added to that as a normal water usage upper limit. This would alert that unusual water usage has been detected that can be critical for consumer to understand (unseen leak, pipe burst, irrigation system stuck in ON position, or just re-filling the pool).

| Meter Size | Normal Operating Range @ 100% Accuracy (+/~1.5%) | AWWA Standard | Low Flow @ 95% Accuracy |
|---|---|---|---|
| ⅝" | ½ to 20 US gpm 0.11 to 4.55 m³/h | 1 to 20 US gpm 0.23 to 4.5 m³/h | ⅛ US gpm 0.03 m³/h |
| ¾" | ¾ to 30 US gpm 0.17 to 6.82 m³/h | 2 to 30 US gpm 0.45 to 6.8 m³/h | ¼ US gpm 0.06 m³/h |
| 1" | 1 to 50 US gpm 0.23 to 11.36 m³/h | 3 to 50 US gpm 0.68 to 11.4 m³/h | ⅜ US gpm 0.09 m³/h |

The above table is for reference regarding maximum flow from a water meter to maintain accuracy. By detecting flow rates at the limit of the meter, a utility can be alerted to the need for a meter upgrade to prevent non-revenue (unaccounted) water usage.

At an operation 722, the meter usage is flagged for review if the water used exceeds at least one of the limits. Otherwise, no action is taken.

In some implementations, the method 700 may further comprise determining a failure of an irrigation system to supply water when the irrigation system usage is forecasted based on expected run time shared by the irrigation system to a company such as, for example, Water Pigeon, Inc. This determination may be made on, for example, an hour slot that the irrigation was planned to run to be compared to expected usage from prior observations. So zero would not be acceptable if irrigation was to have run in the given timeslot. It is noteworthy that prior art attempts do not optically read a water meter. Further, the meter lid according to the present technology can detect if it has been moved to a different location.

Figure 8:
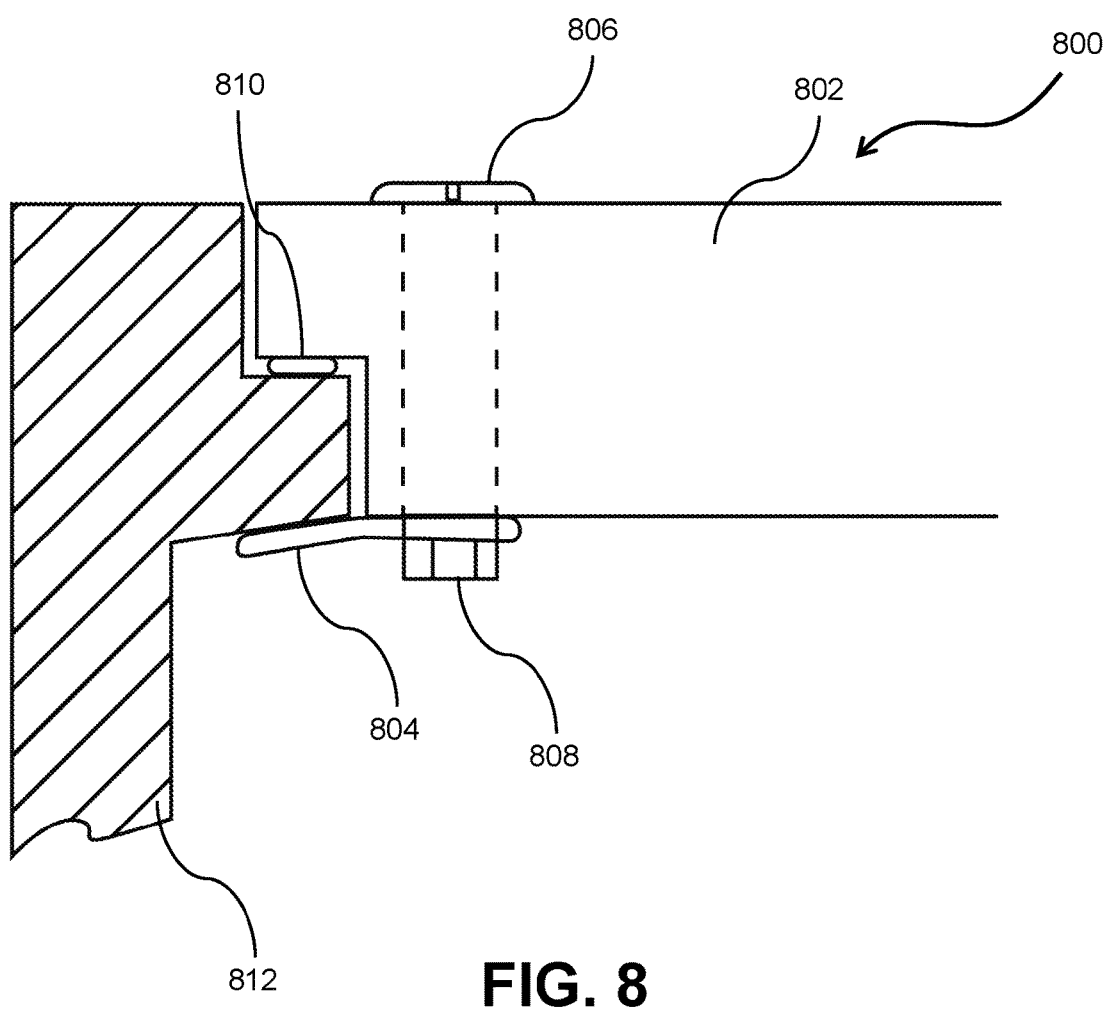
FIG. 8 illustrates a meter reading lid latch mechanism, in accordance with one or more implementations.

FIG. 8 illustrates a meter reading lid latch mechanism 800, in accordance with one or more implementations. This may prevent people from removing the lid without having to use a cable attachment for prevention. In some implementations, lid latches may be used for compression gasket sealing. A meter reading lid 802 may be installed using a cam latch design that holds the meter reading lid 802 in position with a rotating tongue 804 attached to a bolt 806 that is secured with a fastener 808. This provides compression of a gasket seal 810 to the meter box 812 creating a stable meter reading lid position with a dust and water tight seal to the meter box. This design may be use on one or multiple sides of the lid to achieve a stable mounting of lids vary in all sizes and shapes. In some implementations, a lanyard may be attached to the lid to keep it from floating or walking away. The lanyard (lanyard attachment) may be formed from stainless steel or any other suitable material, and attached to the lid and the meter box.

Figure 9:
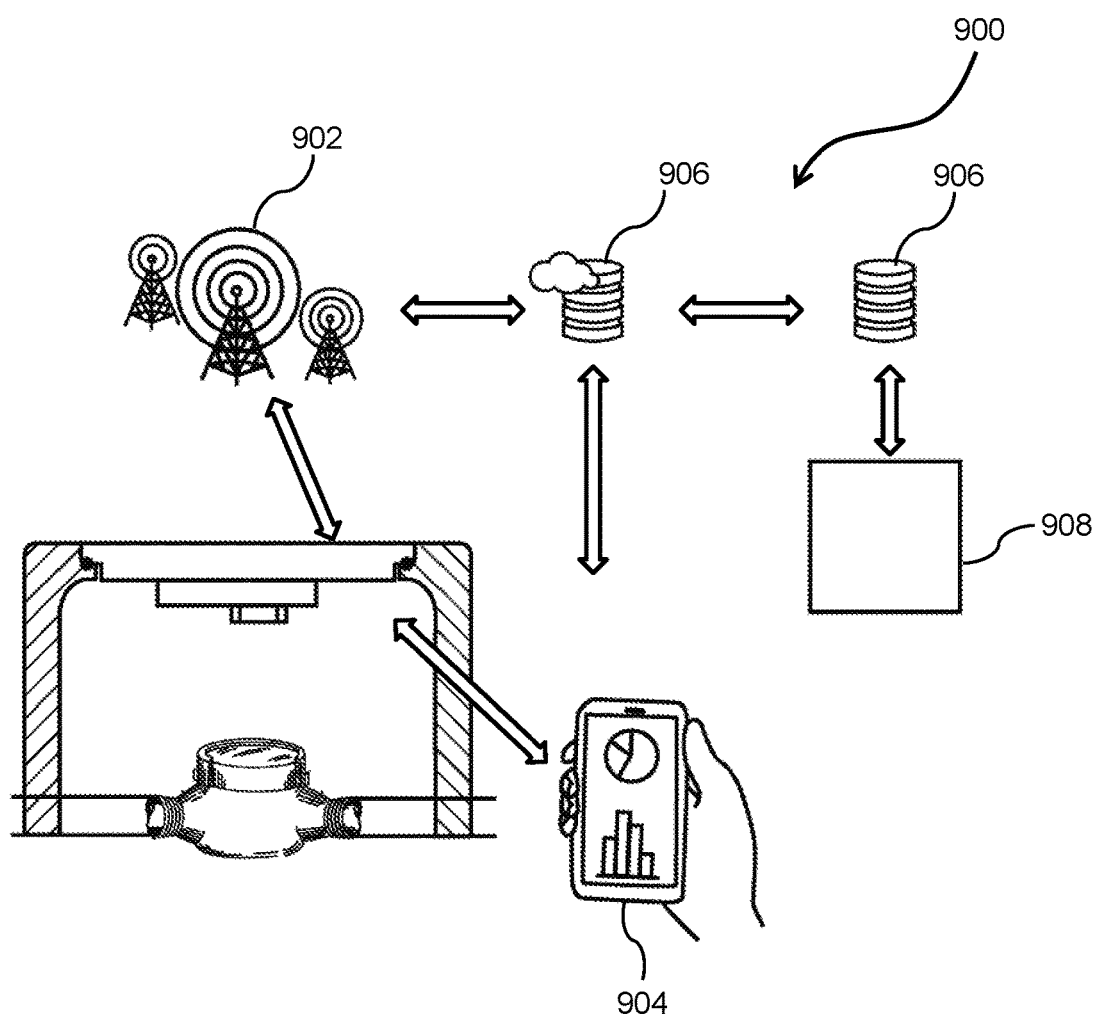
FIG. 9 illustrates a schematic diagram of a system, in accordance with one or more implementations.

FIG. 9 illustrates a schematic diagram of a system 900, in accordance with one or more implementations. This depicts a general overview of what has been discussed. As mentioned herein, some implementations of this disclosure relate to an automated water meter reading device that mounts opposing to measurement equipment or gauges to automatically record and communicate data back to a central database using a wireless network 902. Some implementations include a water meter box lid that optically reads water usage data and communicates the data over a wireless network connection to a database, providing water usage, tamper detection, leak detection, auditing of automated meter reading and meter identity verification. Information may flow to and from wireless device 904. Wireless device 904 may be communicatively coupled with a unit(s) 906 (e.g., a database etc.), electronics enclosure 210 (see FIG. 2), or elsewhere. Remote configuration tools may be implemented in some implementations. Remote configuration tools may change the schedule by which the system records data. For example, the schedule may be set to record once per day at midnight, every hour, every 15 minutes, etc. Information may be sent to or retrieved from databases (units) 906. There may be multiple units 906 and they may perform different functions. Information may be sent to various places such as the mobile device 904 or other locations 908.

A given computing platform 104 may include one or more processors configured to execute machine-readable instructions. The machine-readable instructions may be configured to enable an expert or user associated with the given computing platform 104 to interface with system 100 and/or external resources 130, and/or provide other functionality attributed herein to computing platform(s) 104. By way of non-limiting example, the given computing platform 104 may include one or more of a desktop computer, a laptop computer, a handheld computer, a tablet computing platform, a NetBook, a Smartphone, a gaming console, an irrigation system, a home automation system and/or other computing platforms.

External resources 124 may include sources of information, hosts and/or providers of block chain environments outside of system 100, external entities participating with system 100, and/or other resources. In some implementations, some or all of the functionality attributed herein to external resources 124 may be provided by resources included in system 100.

Server(s) 102 may include electronic storage 126, one or more processors 128, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 126 may comprise non-transitory storage media that electronically stores information. The electronic storage media of electronic storage 126 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 128, information received from server(s) 102, information received from computing platform(s) 104, and/or other information that enables server(s) 102 to function as described herein.

Processor(s) 128 may be configured to provide information processing capabilities in server(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units. These processing units may be physically located within the same device, or processor(s) 128 may represent processing functionality of a plurality of devices operating in coordination. The processor(s) 128 may be configured to execute machine-readable instruction components 108, 110, 112, 114 and/or other machine-readable instruction components. Processor(s) 128 may be configured to execute machine-readable instruction components 108, 110, 112, 114, and/or other machine-readable instruction components by software; hardware; firmware; some combination of software, hardware, and/or firmware; and/or other mechanisms for configuring processing capabilities on processor(s) 128. As used herein, the term "machine-readable instruction component" may refer to any component or set of components that perform the functionality attributed to the machine-readable instruction component. This may include one or more physical processors during execution of processor readable instructions, the processor readable instructions, circuitry, hardware, storage media, or any other components.

It should be appreciated that although machine-readable instruction components 108, 110, 112, 114, are illustrated in FIG. 1 as being implemented within a single processing unit, in implementations in which processor(s) 128 includes multiple processing units, one or more of machine-readable instruction components 108, 110, 112, and/or 114 may be implemented remotely from the other machine-readable instruction components. The description of the functionality provided by the different machine-readable instruction components 108, 110, 112, and/or 114 described herein is for illustrative purposes, and is not intended to be limiting, as any of machine-readable instruction components 108, 110, 112, and/or 114 may provide more or less functionality than is described. For example, one or more of machine-readable instruction components 108, 110, 112, and/or 114 may be eliminated, and some or all of its functionality may be provided by other ones of machine-readable instruction components 108, 110, 112, and/or 114. As another example, processor(s) 128 may be configured to execute one or more additional machine-readable instruction components that may perform some or all of the functionality attributed below to one of machine-readable instruction components 108, 110, 112, and/or 114.

Figure 10:
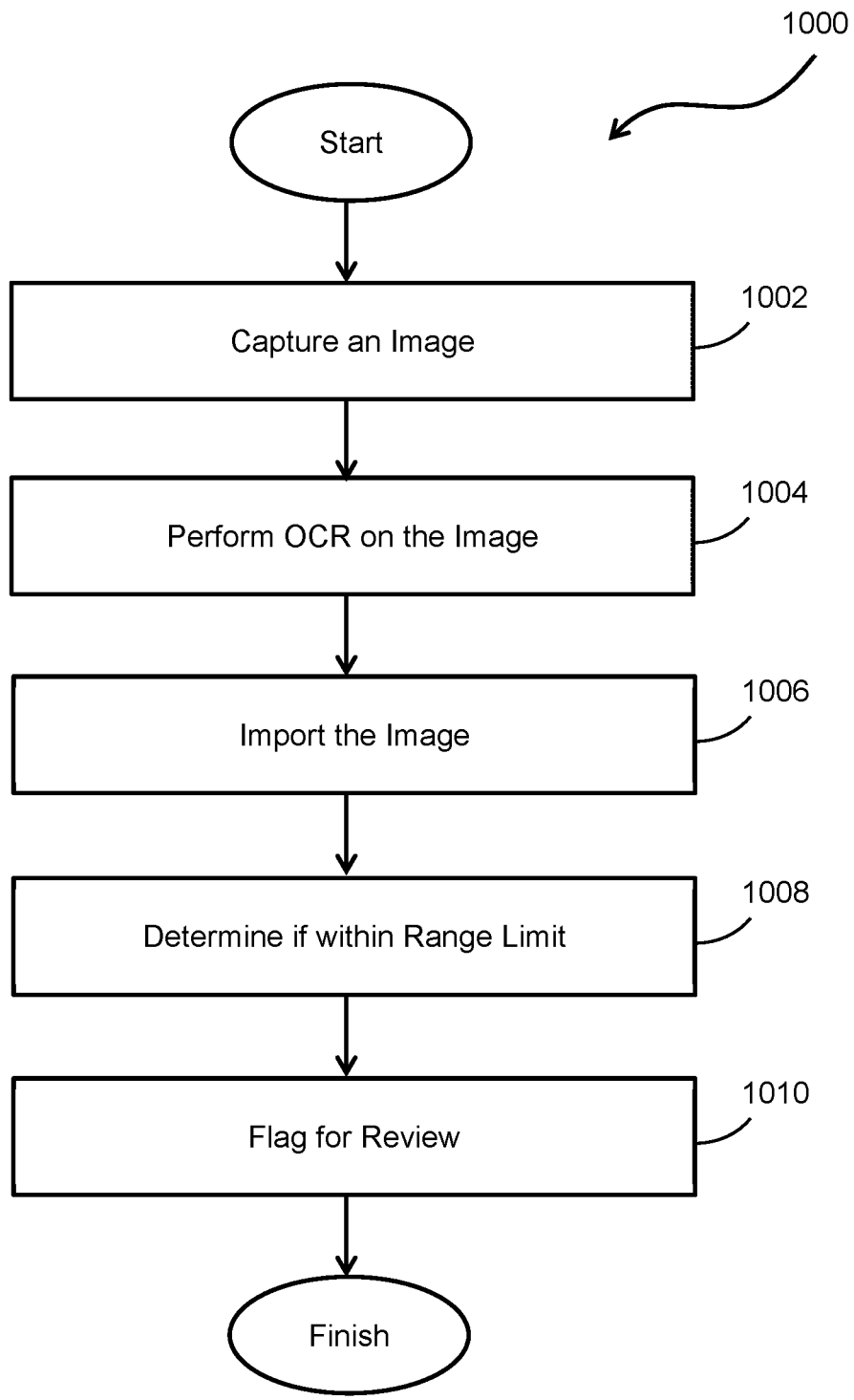
FIG. 10 illustrates a method for automated meter reading, in accordance with one or more implementations.

FIG. 10 illustrates a method for automated meter reading, in accordance with one or more implementations. The operations of method 1000 presented below are intended to be illustrative. In some implementations, method 1000 may be accomplished with one or more additional operations not described, and/or without one or more of the operations discussed. Additionally, the order in which the operations of method 1000 are illustrated in FIG. 10 and described below is not intended to be limiting.

In some implementations, one or more operations of method 1000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1000 in response to instructions stored electronically on an electronic storage medium. The one or more processing devices may include one or more devices configured through hardware, firmware, and/or software to be specifically designed for execution of one or more of the operations of method 1000.

At an operation 1002, an image is captured of a meter register. Operation 1002 may be performed by one or more hardware processors configured to execute a machine-readable instruction component that is the same as or similar to capturing component 108 (as described in connection with FIG. 1), in accordance with one or more implementations. In some implementations, the image is captured by the lid image sensor under the instruction of a processor on the lid, and then sent to a server. An OCR may be performed on the image, and then it may be done again on a cloud processor.

At an operation 1004, OCR is performed on the image. Operation 1004 may be performed by one or more hardware processors configured to execute a machine-readable instruction component that is the same as or similar to OCR component 110 (as described in connection with FIG. 1), in accordance with one or more implementations.

At an operation 1006, the meter register image that was captured is imported. In other words, the captured image from the meter is sent to, for example, electronic storage 126, wireless device 904, etc. Operation 1004 may be performed by one or more hardware processors configured to execute a machine-readable instruction component, in accordance with one or more implementations.

At an operation 1008, it is determined if a new meter register value result is within a given range limit. Operation 1008 may be performed by one or more hardware processors configured to execute a machine-readable instruction component that is the same as or similar to determining component 112 (as described in connection with FIG. 1), in accordance with one or more implementations.

At an operation 1010, usage of a meter containing the meter register is flagged for review upon a determination that the new meter register value result is not within the given range limit. Operation 1010 may be performed by one or more hardware processors configured to execute a machine-readable instruction component that is the same as or similar to flagging component 110 (as described in connection with FIG. 1), in accordance with one or more implementations. The orders of the operations in this disclosure are not limited to the order in which they are described. For example, in some implementations, operation 1008 may be performed before operation 1006.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for automated meter reading, the system comprising:
   a meter reading device lid assembly configured to be positioned opposite a meter face of a separate meter in an in-ground meter box, wherein the lid assembly includes a lid body having a lid body bottom surface configured to face the separate meter on an inside of the in-ground meter box and an electronics enclosure movably attached to the lid body bottom surface and enclosing the electronics, the electronics comprising:
   an image sensor configured to capture an image;
   an electronic storage medium configured to store machine-readable instructions; and
   one or more hardware processors, the one or more hardware processors configured by machine-readable instructions to capture an image of a meter register occupying a particular meter register position within the in-ground meter box and perform OCR on the image, wherein:
   the meter reading device lid assembly further comprises an adjustable slide element configured to iteratively adjust the position of the electronics enclosure on the lid body bottom surface relative to the meter face to align the image sensor to capture the image of the meter register at the particular meter register position within the in-ground meter box; and
   the image sensor is configured to view the meter face through an optically transparent port, the port being configured to form, in the event of a flooding of water inside of the in-ground meter box, an air pocket between a lens associated with the image sensor and the water, the air pocket being at least partially in contact with the water.

2. The system of claim 1, wherein the one or more hardware processors are further configured, upon a determination that a prior reading of the meter register image is available, to load a meter register prior value if available.

3. The system of claim 2, wherein the one or more hardware processors are further configured to identify a most significant changed digit of the new meter register value result that changed from a corresponding digit of the prior reading.

4. The system of claim 3, wherein the one or more hardware processors are further configured to perform OCR on the most significant changed digit and to not perform OCR on any digits of the new meter register value result that are more significant than the most significant changed digit.

5. The system of claim 4, wherein the one or more hardware processors are further configured to perform OCR on any digits of the new meter register value result that are less significant than the most significant changed digit.

6. The system of claim 5, wherein the one or more hardware processors are further configured to store meter register data including the OCR data with a time stamp.

7. The system of claim 6, wherein determining if a new meter register value result is within a given range limit includes determining if the meter register data including the OCR data is within given range limits.

8. The system of claim 1, wherein the one or more hardware processors are further configured to determine a failure of an irrigation system to supply water.

9. The system of claim 1, wherein the one or more hardware processors are further configured by machine-readable instructions to determine if a new meter register value result is within a given range limit, and flag for review usage of a meter containing the meter register upon a determination that the new meter register value result is not within the given range limit.

10. The system of claim 1, wherein the lid assembly further comprises a gasket to form a seal between the electronics enclosure and an outside environment.

11. The system of claim 1, wherein the lid assembly further comprises a compression gasket and a latching mechanism for compressing the gasket to form a seal between the electronics enclosure and an outside environment.

12. A method for automated meter reading, the method comprising:
providing a meter reading device lid assembly, wherein the lid assembly includes a lid body having a lid body bottom surface facing an inside of an in-ground meter box, and an electronics enclosure movably attached to the lid body bottom surface and configured to enclose electronics, the electronics comprising:
an image sensor configured to capture an image;
an electronic storage medium configured to store machine-readable instructions; and
one or more hardware processors; and
providing an optically transparent port, the port being configured to form, in the event of a flooding of water inside of the in-ground meter box, an air pocket between a lens associated with the image sensor and the water, the air pocket being at least partially in contact with the water; and
locating the meter reading device lid assembly such that the lid body bottom surface lies opposite a meter face of a separate meter inside of the in-ground meter box:
providing an adjustable slide element on the lid assembly for iteratively adjusting a position of the electronics enclosure on the lid body bottom surface relative to the meter face;
adjusting, via at least one adjustment of the adjustable slide element of the lid assembly, the position of the electronics enclosure to align the image sensor to capture an image of a meter register of the separate meter, the meter register occupying a particular meter register position within the in-ground meter box;
capturing, using the aligned image sensor, an image of the meter register occupying the particular meter register position within the in-ground meter box; and
performing OCR on the image.

13. The method of claim 12, further comprising, upon a determination that a prior reading of the meter register image is available, loading a meter register prior value if available.

14. The method of claim 13, further comprising identifying a most significant changed digit of the new meter register value result that changed from a corresponding digit of the prior reading.

15. The method of claim 14, further comprising performing OCR on the most significant changed digit and not performing OCR on any digits of the new meter register value result that are more significant than the most significant changed digit.

16. The method of claim 15, further comprising performing OCR on any digits of the new meter register value result that are less significant than the most significant changed digit.

17. The method of claim 16, further comprising storing meter register data including the OCR data with a time stamp.

18. The method of claim 17, wherein determining if a new meter register value result is within a given range limit includes determining if the meter register data including the OCR data is within given range limits.

19. The method of claim 12, further comprising determining a failure of an irrigation system to supply water.

20. The method of claim 12, further comprising determining if a new meter register value result is within a given range limit, and flagging for review usage of a meter containing the meter register upon a determination that the new meter register value result is not within the given range limit.

* * * * *